United States Patent
Wei-Chieh et al.

(10) Patent No.: US 7,230,824 B2
(45) Date of Patent: Jun. 12, 2007

(54) CLIP-ON HANGER FOR ELECTRICAL DATA STORAGE AND RETRIEVAL DEVICE

(75) Inventors: Chen Wei-Chieh, Taipei (TW); Yu Wen-Lung, Taipei (TW)

(73) Assignee: Shuttle Inc., Taipei (TW)

( * ) Notice: Subject to any disclaimer, the term of this patent is extended or adjusted under 35 U.S.C. 154(b) by 392 days.

(21) Appl. No.: 10/879,104

(22) Filed: Jun. 30, 2004

(65) Prior Publication Data
US 2006/0000961 A1  Jan. 5, 2006

(51) Int. Cl.
*G06K 1/16* (2006.01)
(52) U.S. Cl. ..................................... 361/685; 312/223.2
(58) Field of Classification Search ............. 312/223.2, 312/334.4, 319.1, 330.1, 334.7; 439/377; 361/685, 683
See application file for complete search history.

(56) References Cited

U.S. PATENT DOCUMENTS

| | | | |
|---|---|---|---|
| 6,239,358 B1 * | 5/2001 | Chang | 174/362 |
| 6,304,457 B1 * | 10/2001 | Liu et al. | 361/799 |
| 6,313,985 B1 * | 11/2001 | Chen et al. | 361/685 |
| 6,318,679 B1 * | 11/2001 | Yang et al. | 248/27.1 |
| 6,590,775 B2 * | 7/2003 | Chen | 361/725 |
| 6,798,653 B2 * | 9/2004 | Chen et al. | 361/685 |
| 6,882,526 B2 * | 4/2005 | Neukam et al. | 361/685 |
| 6,948,967 B2 * | 9/2005 | Scherer et al. | 439/377 |
| 7,068,502 B2 * | 6/2006 | Chen et al. | 361/685 |

* cited by examiner

*Primary Examiner*—Gwendolyn Baxter
(74) *Attorney, Agent, or Firm*—Birch, Stewart, Kolasch & Birch, LLP

(57) ABSTRACT

A clip-on hanger for electrical data storage and retrieval devices, which facilitates rapid installation and removal of a data storage and retrieval device, is disclosed by the present invention. The clip-on hanger includes a plate body, which has an inserting tab formed on its end, a hanger portion formed on the opposing end, expanding rail springs disposed on the top and the opposing bottom of plate body; a fixing member assembled onto the plate body; and a movable locking clamp member installed on the hanger portion of the plate body. By utilizing the clip of the fixing member, the clip-on hangers can be quickly and easily mounted onto the both side surfaces of the data storage and retrieval device without changing any configuration or structure of the data storage and retrieval device. This assembly can be slid into and secured inside a receptive mount without using any screw components. The receptive mount can be further installed into a computer.

11 Claims, 10 Drawing Sheets

CLIP-ON HANGER FOR ELECTRICAL DATA STORAGE AND RETRIEVAL DEVICE

BACKGROUND OF THE INVENTION

The present invention relates in general to a mounting means for electrical data storage and retrieval devices, and more particularly, to a clip-on hanger for electrical data storage and retrieval devices, which can quickly and easily secure a data storage and retrieval device into a computer.

Owning to the progress of the computer technology, computers are widely accepted today. Computers are not only utilized in homes for document producing and data storage, but also used in enterprises or factories for management analysis and automatic manufacture. Following the increasing complexity of the application of computers, computers have larger files and more data than ever. The performance of data storage and retrieval device like hard disk drives, floppy disk drives, and compact disk (CD) drives has become more important. Consequently, various compartments are provided in a conventional personal computer in order to receive different data storage and retrieval devices.

The combination method conventionally used to connect a data storage and retrieval device 2a to the computer chassis 3a is illustrated in FIG. 1. There are various compartments 31a formed inside the computer chassis 3a in order to receive different data storage and retrieval devices 2a. The data storage and retrieval device 2a has alignment holes 21a bore on its both side surfaces. The chassis 3a has corresponding through holes 32a bore on its both side plates. When the data storage and retrieval device 2a has been inserted into the chassis 3a and positioned at a designated location, the alignment holes 21a of the data storage and retrieval device 2a will be aligned with the through holes 32a of the computer chassis 3a. A consumer can insert a bolt component 1a, via the through holes 32a of the computer chassis 3a, into the alignment holes 21a of the data storage and retrieval device 2a, and further screw the bolt component 1a onto the data storage and retrieval device 2a. Thereby, the data storage and retrieval device 2a is secured firmly on the chassis 3a. When a consumer wants to detach the data storage and retrieval device 2a from the chassis 3a, he can utilize a screwdriver to remove the bolt component 1a from the computer and further draw the data storage and retrieval device 2a out from the chassis 3a.

However, it is inconvenient for a consumer to replace or upgrade the data storage and retrieval device 2a, because the data storage and retrieval device 2a is mounted via bolt components 1a. A consumer has to use a hand tool like screwdriver to screw the bolt components 1a out from the data storage and retrieval device 2a in order to replace the data storage and retrieval device 2a. Furthermore, a consumer could inadvertently strip the threads of the bolt component 1a. That will be a troublesome condition for the consumer.

BRIEF SUMMARY OF THE INVENTION

The present invention provides a clip-on hanger for electrical data storage and retrieval devices, which facilitates rapid installation and removal of a data storage and retrieval device. The clip-on hangers of the present invention can be quickly and easily mounted onto both side surfaces of the data storage and retrieval device without changing any configuration or structure of the data storage and retrieval device. This assembly can be slid into and secured inside a receptive mount without using any screw components. The receptive mount can be further installed into a computer.

One feature of the present invention is that the clip-on hanger includes a plate body, which has an inserting tab formed on its end, a hanger portion formed on the opposing end, expanding rail springs disposed on the top and the opposing bottom of plate body; a fixing member assembled onto the plate body; and a movable locking clamp member installed on the hanger portion of the plate body. By utilizing the clip of the fixing member, the clip-on hangers can be mounted onto the both side surfaces of the data storage and retrieval device. To install the data storage and retrieval device into a receptive mount, the expanding rail springs are slid into the rails formed on the receptive mount. The inserting tab and the clip tabs of the plate body are inserted into corresponding concave holes of the receptive mount. The locking clamp member is adjusted to a suitable position so that one end of the locking clamp member is pressing against the data storage and retrieval device, while the other end of the locking clamp member is rested and secured onto the receptive mount. Thereby, the data storage and retrieval device is easily, quickly and firmly secured inside a receptive mount.

Another feature of the present invention is that the position the fixing member secured on the plate body is corresponding to the alignment holes of the data storage and retrieval device; therefore, the clip-on hangers can be mounted onto the data storage and retrieval device without changing any configuration or structure of the data storage and retrieval device. The fixing member includes a metal sheet body; top and bottom snap clips by which the fixing member are snapped onto the plate body; and expanding hook clips extending from the ends of the metal sheet body, which can be clipped onto the alignment holes of the data storage and retrieval device in order to secure the clip-on hanger onto one side of the data storage and retrieval device.

A further feature of the present invention is that the fixing member can be integrated formed on the plate body. The fixing member can be a set of spring pins. By inserting the spring pins into the alignment holes of the data storage and retrieval device, the clip-on hanger can be directly mounted onto the data storage and retrieval device.

Still another feature of the present invention is that the locking clamp member includes a support plate; a press plate extending from the bottom of the support plate, which is utilized to press against the top surface of the data storage and retrieval device; a clamp plate extending from the top of the support plate in a direction opposite to the press plate, the clamp plate has a clamp tab formed on its bottom which can be inserted into the insertion slot of the receptive mount; and a threaded clamp guide extruding from the support plate in a direction same to the clamp plate. The threaded clamp guide is inserted into a vertical track formed on the hanger portion of the plate body. The threaded clamp guide can be moved upward or downward within the vertical track to adjust the locking clamp member to a suitable position. A bolt is utilized to secure the threaded clamp guide on the hanger portion after the adjustment.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

These as well as other features of the present invention will become more apparent upon reference to the drawings therein.

DETAILED DESCRIPTION OF THE INVENTION

Figure 1:
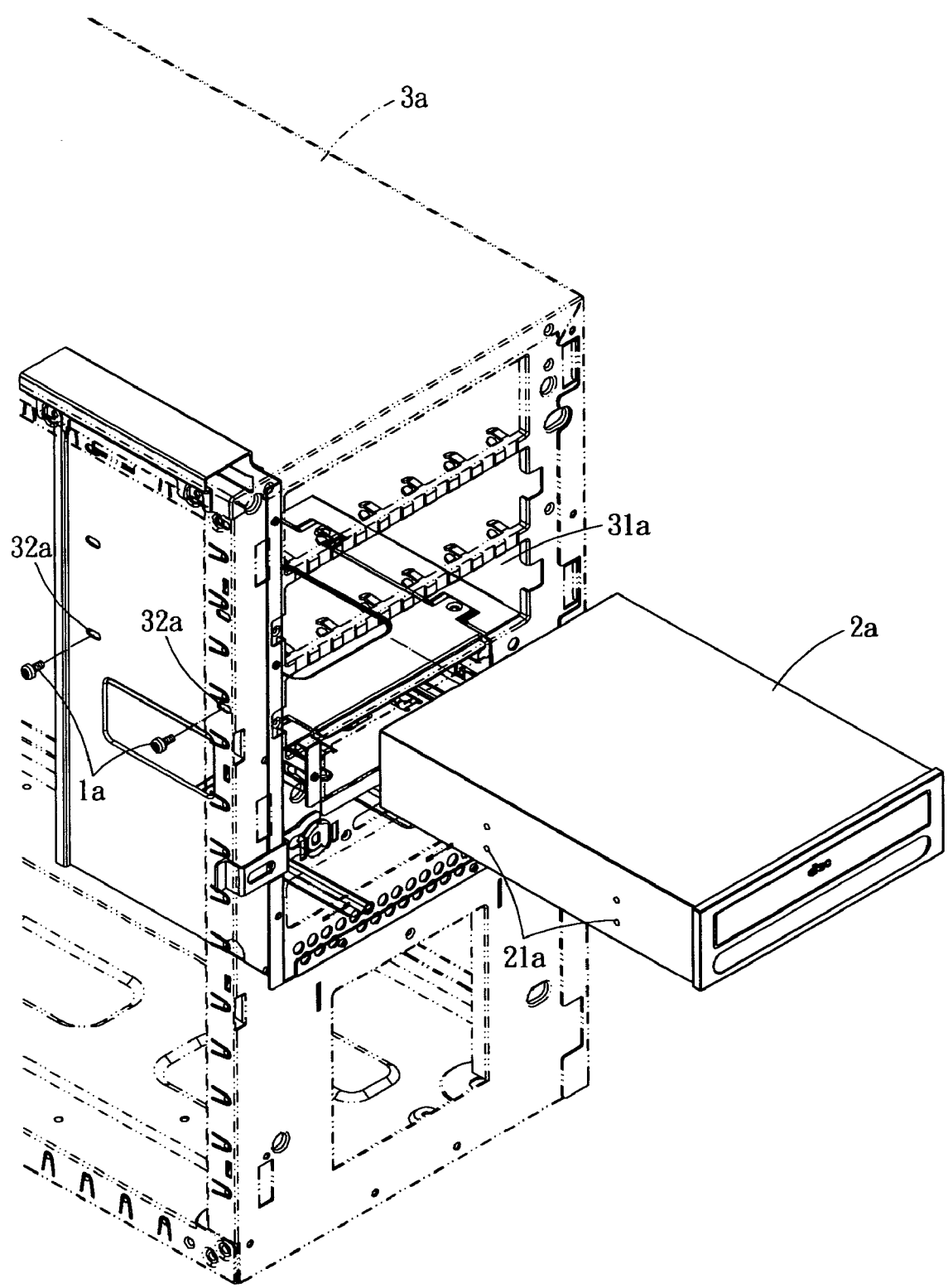
FIG. 1 shows a perspective view of a CD dive and a computer chassis, illustrating the installation method of the prior art.

Reference will now be made in detail to the preferred embodiments of the present invention, examples of which are illustrated in the accompanying drawings. Wherever possible, the same reference numbers are used in the drawings and the description to refer to the same or like parts.

Figure 7:
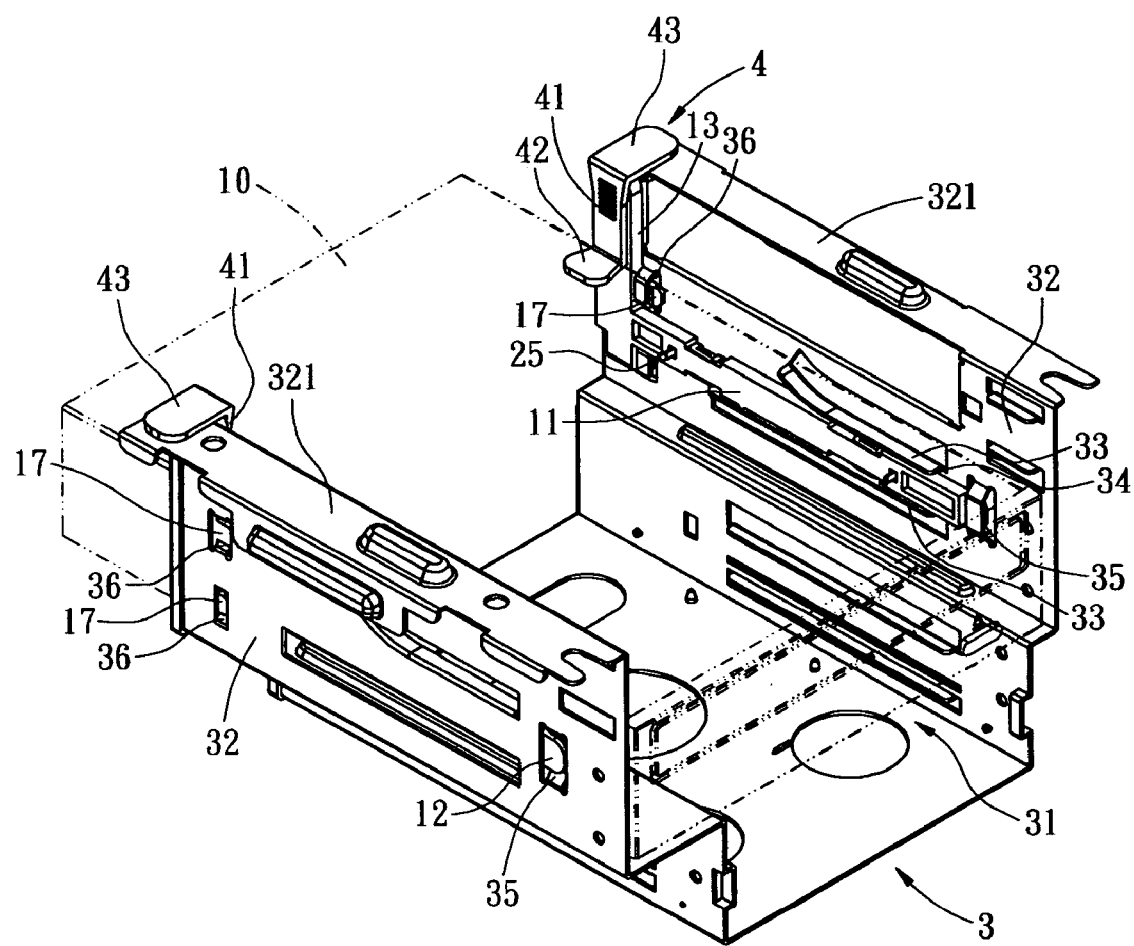
FIG. 7 shows a perspective view of a CD drive, which is secured inside a receptive mount.
Figure 8:
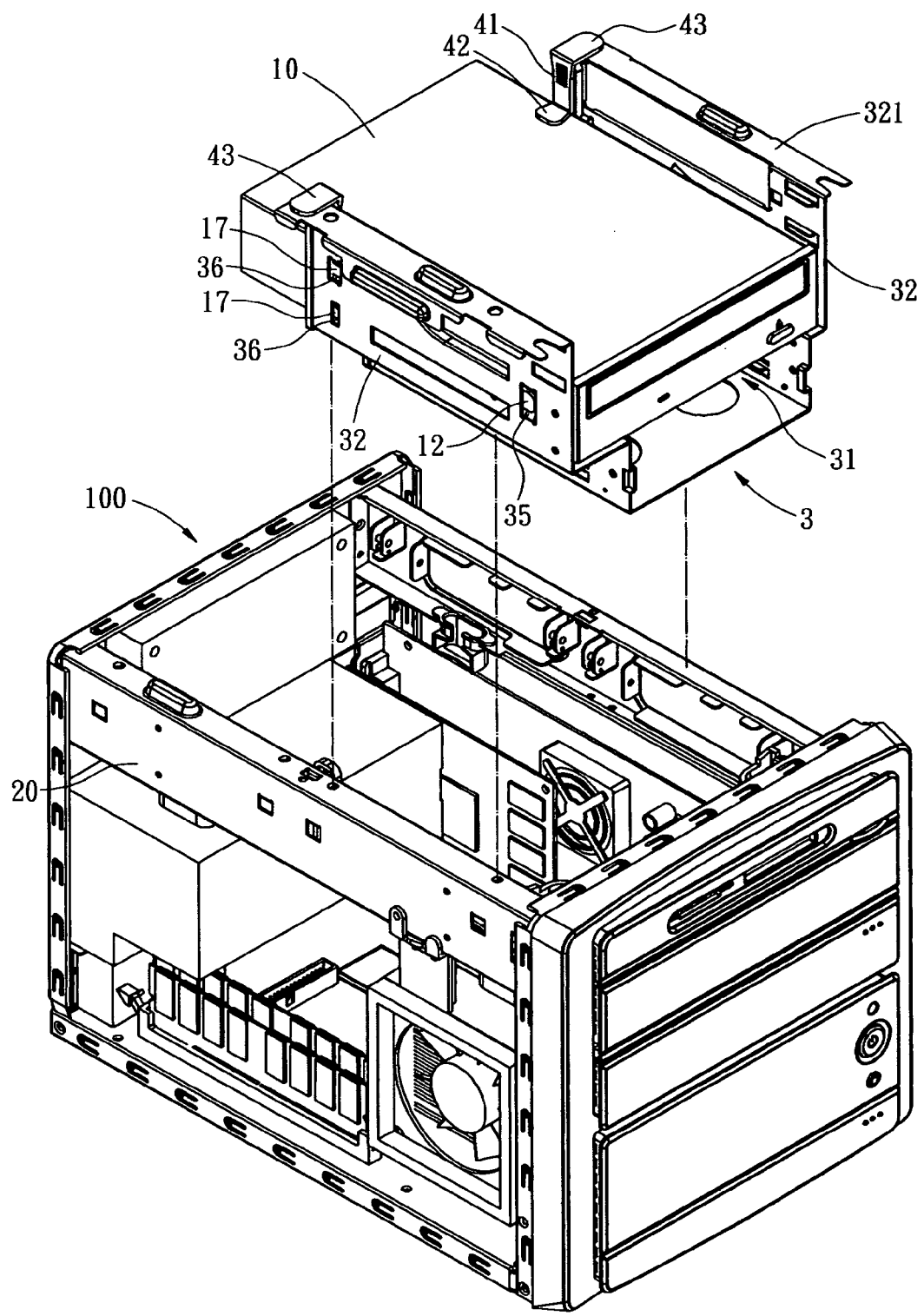
FIG. 8 shows a perspective view of a receptive mount assembled with a CD drive before being installed into a computer chassis.
Figure 9:
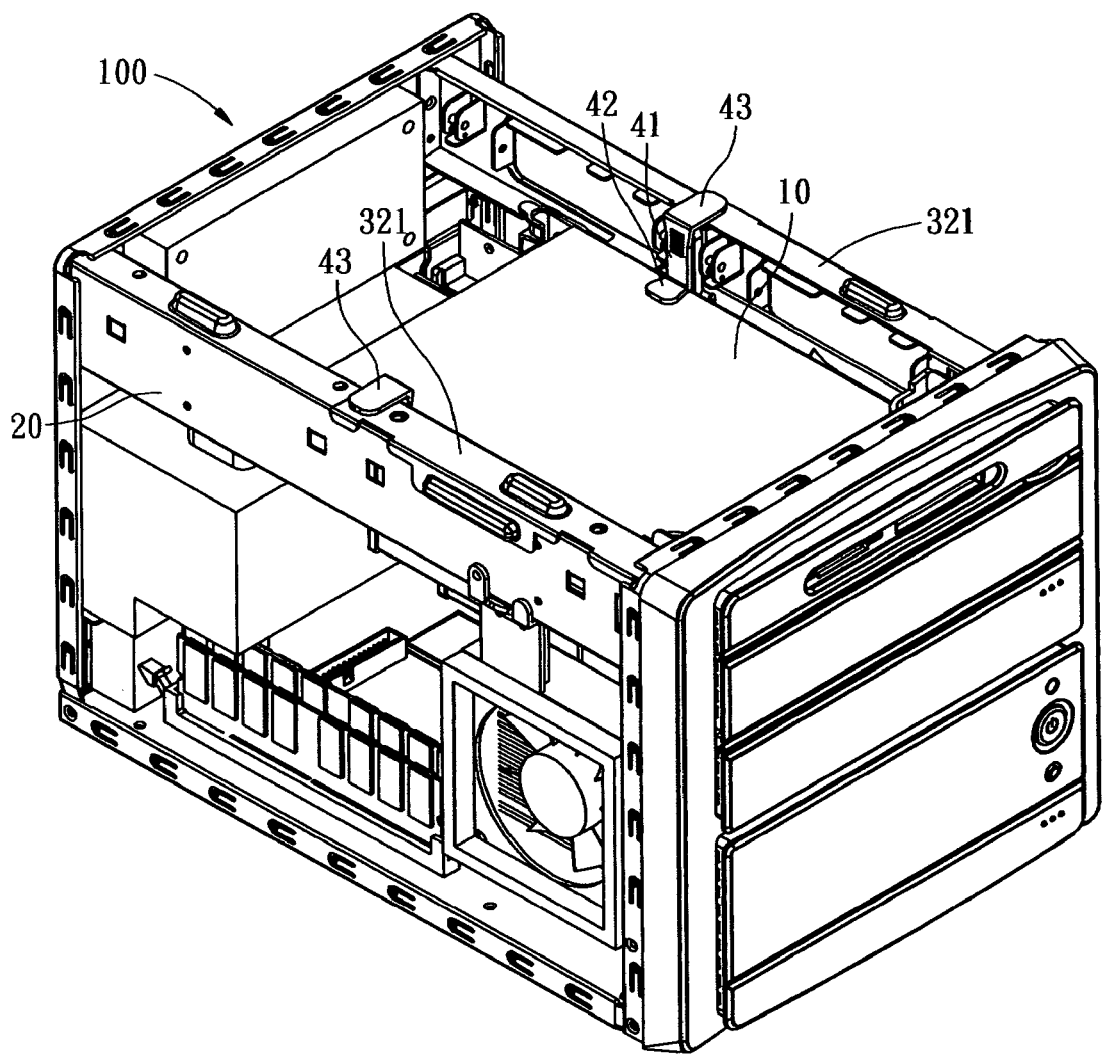
FIG. 9 shows a condition that a receptive mount received with a CD drive has been installed into a chassis of a computer.

As shown in FIG. 7 through FIG. 9, the data storage and retrieval device 10 illustrated in one embodiment of the present invention is a compact drive (CD) drive. By utilizing the clip of clip-on hangers 1, the data storage and retrieval device 10 can be secured into a receptive mount 3. This assembly can be further installed into a chassis 20 of a desktop computer 100.

Figure 2:
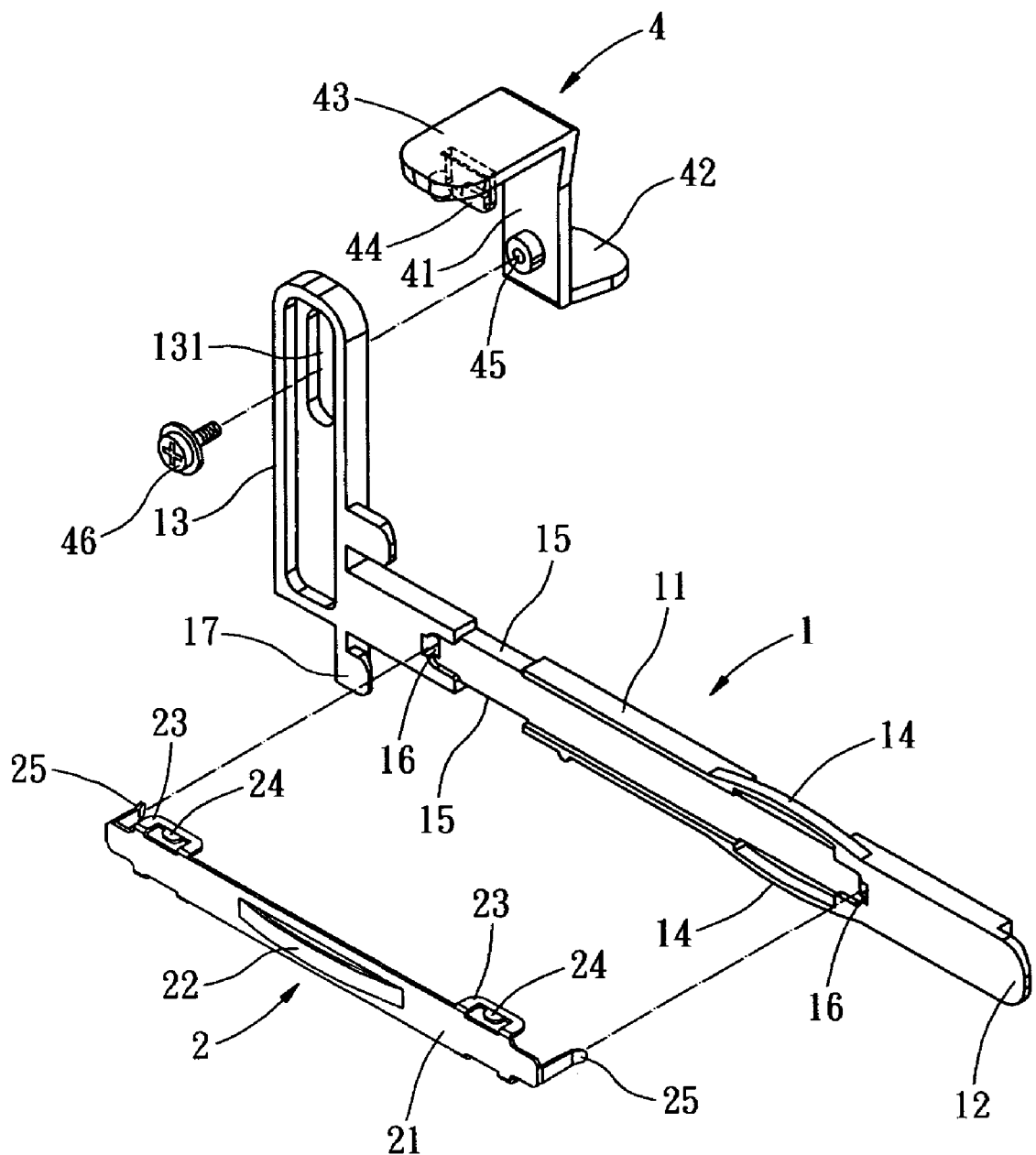
FIG. 2 shows an exploded view of a clip-on hanger in accordance with the present invention.

Referring to FIG. 2, the clip-on hanger 1 includes a plate body 11. The length of the plate body 11 is proximately as long as a CD drive. The plate body has an inserting tab 12, which is formed on one end of the plate body 11; a hanger portion 13 extending vertically, which is formed on the opposing end of the plate body 11; expanding rail springs 14 with an arc shape, which are disposed on the top and the opposing bottom of plate body 11, being used as a sliding rail; concaves 15, which are cut from the top and the opposing bottom of the plate body 11 adjacent the front and the rear portion of the plate body 11; insert holes 16, which are bored on the side surface of the plate body 11 at positions corresponding to the alignment holes 101 of the data storage and retrieval device 10; and clip tabs 17, which are formed adjacent to the hanger portion 13.

A fixing member 2 is assembled onto the plate body 11. The fixing member 2 includes a metal sheet body 21; an expanding rail spring 22 disposed on a side surface of the fixing member 2, which extrudes outward from the fixing member 2 in a direction opposing the plate body 11; top and bottom snap clips 23 having a clip tab 24 thereon, which are formed adjacent the front and the rear portion of the metal sheet body 21, the snap clips 23 being snapped onto the concaves 15 of the plate body 11; and expanding hook clips 25, which extend from the two ends of the metal sheet body 21, being inserted through the insert holes 16 of the plate body 11 to clip onto the alignment holes 101 of the data storage and retrieval device 10 and thereby mount the clip-on hanger 1 onto one side of the data storage and retrieval device 10.

A locking clamp member 4 is assembled onto the hanger portion 13. The locking clamp member 4 includes a support plate 41; a press plate 42 extending from the bottom of the support plate 41, which is utilized to press against the top surface of the data storage and retrieval device 10; a clamp plate 43 extending from the top of the support plate 41 in a direction opposite to the press plate 42, having clamp tab 44 formed on its bottom which can be inserted into the insertion slot 332 of the orientation plate 321 of the receptive mount 3; and a threaded clamp guide 45 extruding from the support plate 41 in a direction same to the clamp plate 43. The threaded clamp guide 45 is inserted into a vertical track 131 formed on the hanger portion 13. The threaded clamp guide 45 can be moved upward or downward within the vertical track 131 to adjust the locking clamp member 4 to a suitable position so that the locking clamp member 4 is pressing against the data storage and retrieval device 10. A bolt 46 is utilized to secure the threaded clamp guide 45 on the hanger portion 13 after the adjustment.

Figure 3:
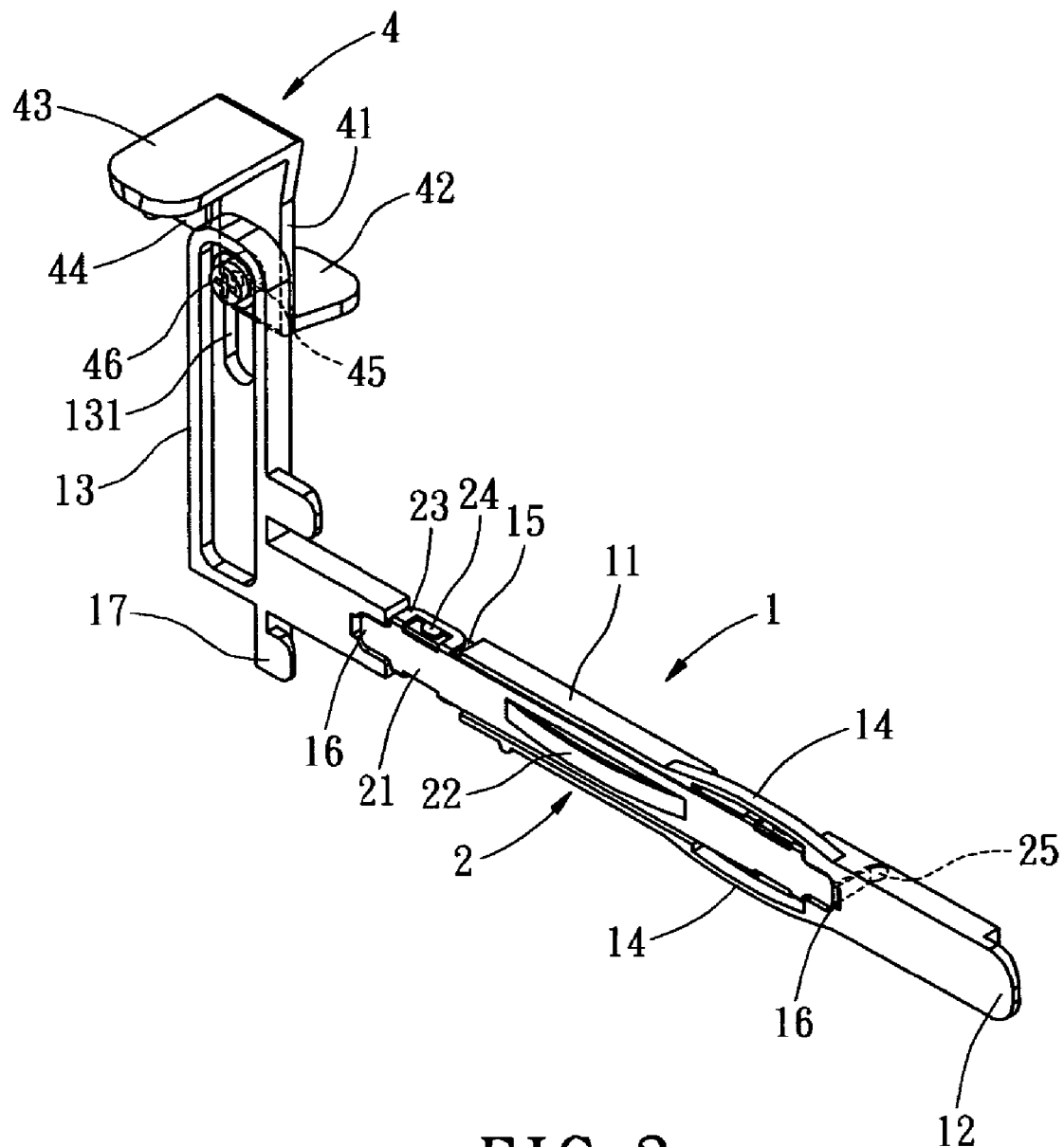
FIG. 3 shows a perspective view of a clip-on hanger in accordance with the present invention.

Referring to FIG. 2 and FIG. 3, in order to assemble the clip-on hanger 1, a consumer snaps the fixing member 2 onto the plate body 11 with the expanding hook clip 25 inserted through the insert holes 16 of the plate body 11, further inserts the threaded clamp guide 45 of the locking clamp member 4 into the vertical track 131, and finally screws the bolt 46 onto the threaded clamp guide 45 to movably install the locking clamp member 4 onto the clip-on hanger 1.

Figure 4:
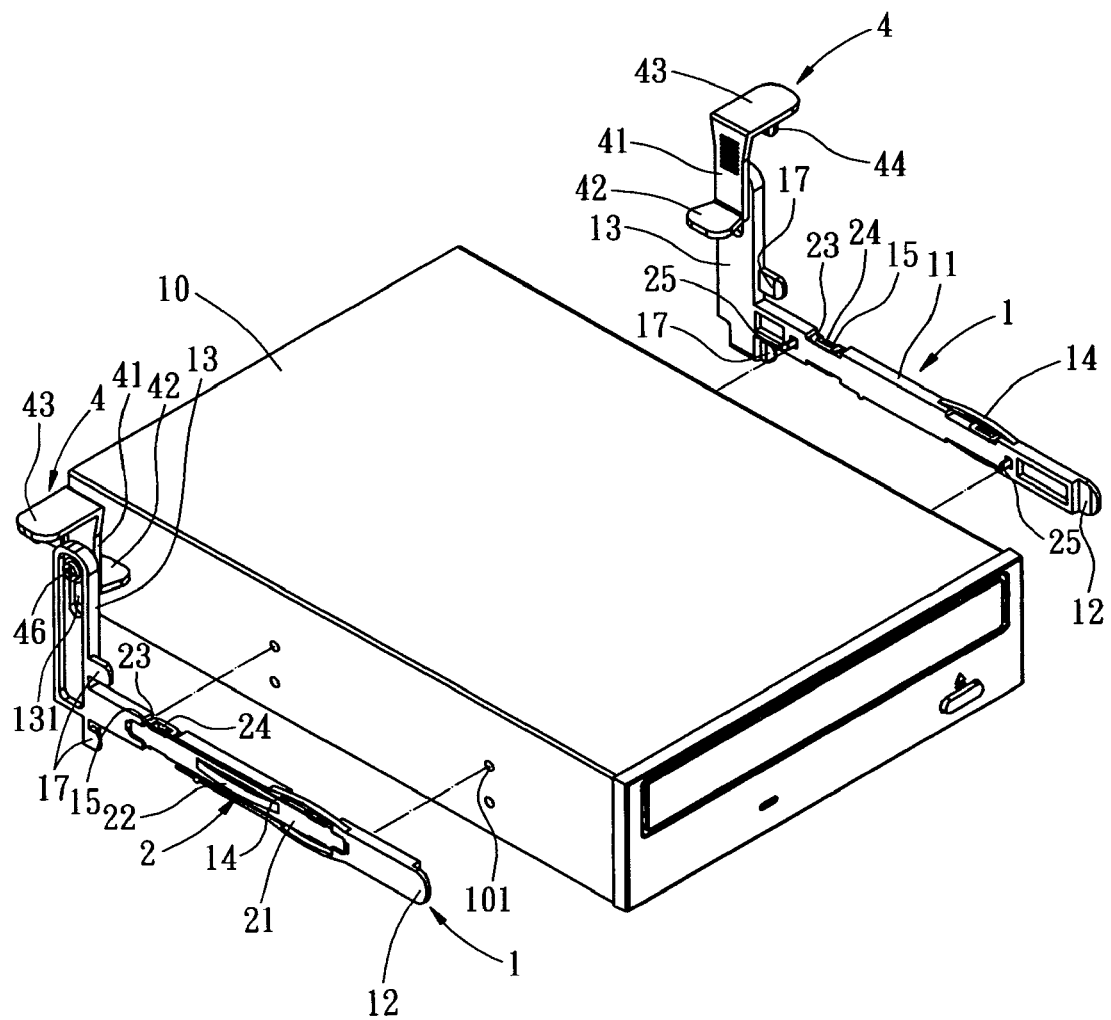
FIG. 4 shows a perspective view of two clip-on hangers and a CD drive onto which the two clip-on hangers will be mounted.

Referring to FIG. 4, to secure clip-on hangers 1 onto both sides of the data storage and retrieval device 10, a consumer just inserts the expanding hook clips 25 of the clip-on hanger 1 into the alignment holes 101 of the data storage and retrieval device 10. This insertion fixes clip-on hangers 1 onto both sides of the data storage and retrieval device 10. Thereby, a consumer can utilize clip-on hangers 1 to secure the data storage and retrieval device 10 inside the desktop computer 100.

In the present invention, the data storage and retrieval device 10 is installed in a receptive mount 3 before being installed inside a desktop computer 100. The receptive mount 3 has an approximate U-shaped receptive space 31; rails 34 formed by opposing projecting plates 33 cut and bent from the side plate 32 of the receptive mount 3; concave holes 35 cast on the front portion of the receptive mount 3 to receive the inserting tab 12; and concave holes 36 cast on the rear portion of the receptive mount 3 to receive the clip tabs 17.

Figure 5:
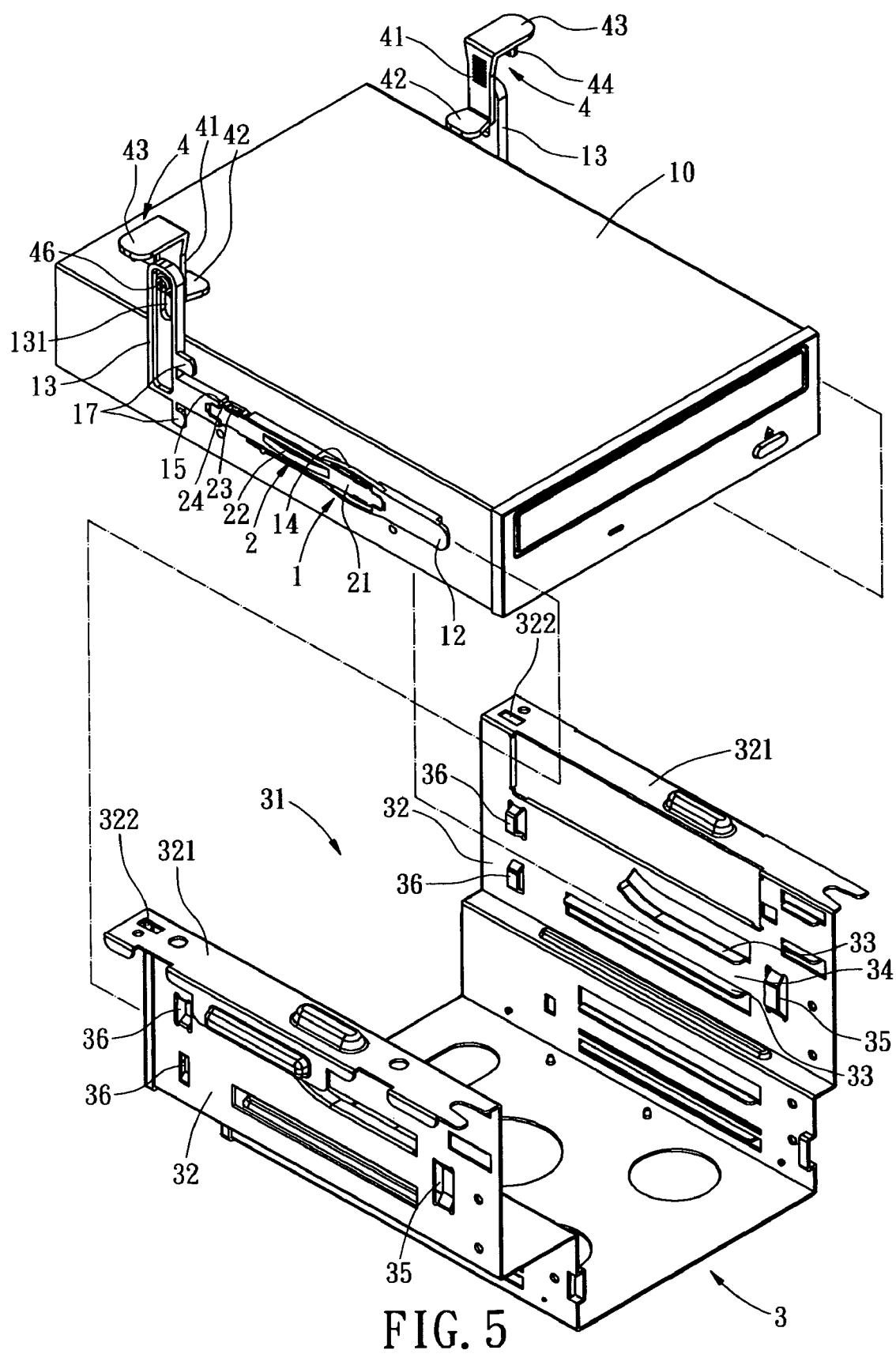
FIG. 5 shows a perspective view of a CD drive mounted with two clip-on hangers, and a receptive mount into which the CD drive will be installed.

Referring to FIG. 5, a data storage and retrieval device 10, which has clip-on hangers 1 installed on its both sides, can be inserted into the U-shaped receptive space 31 of the receptive mount 3. The expanding rail springs 14, which are disposed on the top and the bottom of clip-on hangers 1, are slid into the rails 34 formed on the side plates 32 of the receptive mount 3, expanding against the projecting plates 33 of the receptive mount 3; meanwhile, the expanding rail springs 22, which are disposed on the side surfaces of clip-on hangers 1, expand against the wall surfaces of the rails 34. Because of the expansion of the expanding rail springs 14, 22, the data storage and retrieval device 10 is firmly secured inside the receptive mount 3.

Figure 6:
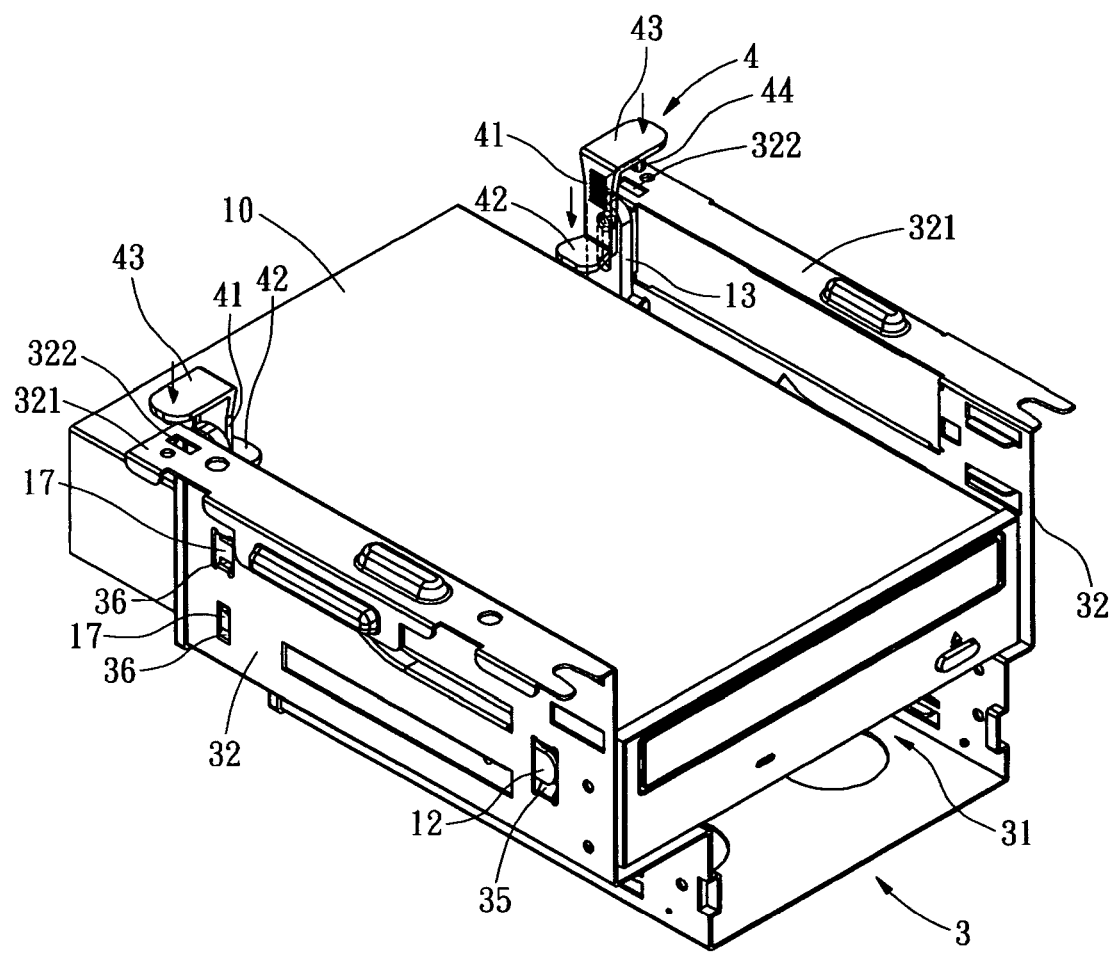
FIG. 6 shows a condition that the tab components of the clip-on hanger are being inserted into the corresponding concave holes of the receptive mount.

Referring to FIG. 6, when the data storage and retrieval device 10 has been inserted into the receptive mount 3, the inserting tabs 12, which are formed on one end of the plate bodies 11, are inserted into the concave hole 35; meanwhile, the clip tabs 17 are clipped into the concave holes 36. The consumer can further adjust the locking clamp member 4 to a suitable position so that the press plate 42 of the locking clamp member 4 is pressing against the top surface of the data storage and retrieval device 10. Moreover, the clamp tabs 44 formed on the bottom of the clamp plates 43 are inserted into the insertion slots 332 of the orientation plates 321 of the receptive mount 3. The aforementioned procedures complete roughly the installation of the data storage and retrieval device 10. By utilizing the clip-on hangers 1, the data storage and retrieval device 10 is conveniently and firmly secured into the receptive mount 3, as is illustrated in FIG. 7.

To remove the data storage and retrieval device 10 from the receptive mount 3, a consumer pulls merely the locking clamp member 4 upward to release the press plate 42, and to unplug the clamp tabs 44 of the clamp plates 43 from the insertion slots 332 of the receptive mount 3. The consumer further holds the hanger portions 13 of the clip-on hangers 1, and then pushes the data storage and retrieval device 10 out from the receptive mount 3. The data storage and retrieval device 10 can thereby removed from the receptive mount 3 for exchange or maintenance.

Referring to FIG. 8, when the data storage and retrieval device 10 has been mounted into the receptive mount 3, the receptive mount 3 can be further installed into a computer 100. The receptive mount 3 is put directly into the computer 100, with the orientation plates 321 of the receptive mount 3 resting on the chassis 20 of the computer 100. The receptive mount 3 can be secured on the chassis 20 by means of screwing or pin insertion. The data storage and retrieval device 10 is, therefore, secured inside the computer 100 via utilizing the receptive mount 3, as is illustrated in FIG. 9.

Figure 10:
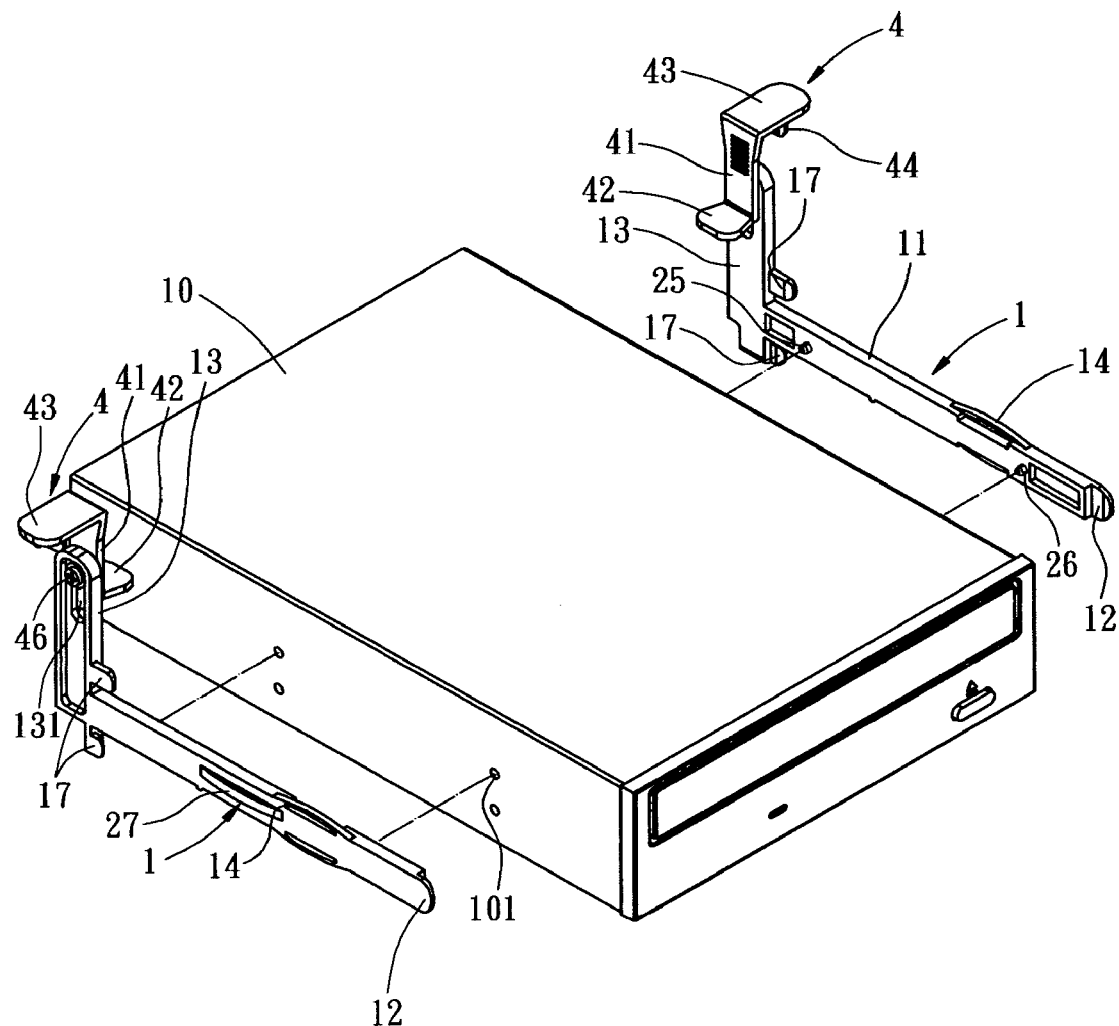
FIG. 10 shows a perspective view of another embodiment of clip-on hangers in accordance with the present invention.

Another embodiment of the present invention is shown in FIG. 10, wherein the fixing member 2 is integratedly formed in the plate body 11. In this embodiment, the fixing member is a set of spring pins 26, which are integratedly formed on the side surface of the plate body 11. The spring pins 26 are inserted into the alignment holes 101 in order to secure the clip-on hangers 1 onto both sides of the data storage and retrieval device 10. Additionally, an expanding rail spring 27 is integratedly formed on a side surface of the plate body 11 in order to press against the wall surfaces of the rails 34 of the receptive mount 3.

To sum up, clip-on hangers 1 of the present invention can be quickly and easily mounted onto both side surfaces of the data storage and retrieval device 10. This assembly can be slid into and secured inside the receptive mount 3 without using any screw components. The receptive mount 3 can be further installed into the computer 100. This installation needs not to change any configuration or structure of the data storage and retrieval device 10.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A clip-on hanger for an electrical data storage and retrieval device, by utilizing a slide-in mounting thereof, the data storage and retrieval device capable of quickly and easily being secured into a receptive mount of an electrical equipment, the clip-on hanger comprising:
    a fixing member to be mounted to one side surface of the data storage and retrieval device;
    a plate body having an inserting tab formed on one end thereof, a hanger portion extending vertically from the opposing end thereof, and two expanding rail springs respectively disposed on the top and the opposing bottom thereof, wherein the fixing member is assembled onto the plate body so that the data storage and retrieval device can be slid and mounted into the receptive mount via the plate body; and
    a locking clamp member movably installed onto the plate body in order to be adjusted to a position at which on end thereof presses against the data storage and retrieval device while the other end thereof is inserted and mounted into the receptive mount.

2. The clip-on hanger of claim 1, wherein the data storage and retrieval device is a CD drive.

3. The clip-on hanger of claim 1, wherein the electrical equipment is a personal computer.

4. The clip-on hanger of claim 1, wherein the expanding rail spring is an elastic sliding rail.

5. The clip-on hanger of claim 1, wherein the plate body further includes a concave cut from each the top and the opposing bottom thereof adjacent to each the front and the rear portion thereof, an insert hole bored on the side surface thereof at a position corresponding to an alignment hole of the data storage and retrieval device, and a clip tab formed adjacent to the hanger portion.

6. The clip-on hanger of claim 1, wherein the fixing member includes a metal sheet body, an expanding rail spring disposed on one side surface of the fixing member and extruded outward in a direction opposing the plate body, a top and a bottom snap clips each having a clip tab thereon and formed adjacent to the front and the rear portion of the metal sheet body, and an expanding hook clip extending from each end of the metal sheet body.

7. The clip-on hanger of claim 6, wherein the receptive mount includes a concave hole formed on each side plate of the receptive mount at a location corresponding to each the clip tab.

8. The clip-on hanger of claim 1, wherein the receptive mount includes an substantially U-shaped receptive space, a rail formed by a plurality of opposing projecting plates on each the side plate thereof, and a concave hole cast at a location corresponding to the inserting tab.

9. The clip-on hanger of claim 1, wherein the locking clamp member includes a support plate, a press plate extending from the bottom of the support plate, utilized to press against the top surface of the data storage and retrieval device, a clamp plate extending from the top of the support plate in a direction opposite to the press plate, having a clamp tab formed on the bottom thereof, wherein the clamp tab can be inserted into an insertion slot of an orientation plate of the receptive mount, and a threaded clamp guide extruding from the support plate in a direction same as the clamp plate, being inserted into a vertical track of the hanger portion with a bolt to secure after the adjustment of the locking clamp member.

10. The clip-on hanger of claim 1, wherein the fixing member is a set of spring pins integrally formed on the plate body.

11. The clip-on hanger of claim 1, further comprising an expanding rail spring integrally formed on one side surface of the plate body, opposing to the side plate of the receptive mount.

* * * * *